Patented Oct. 3, 1933

1,929,079

UNITED STATES PATENT OFFICE 1,929,079

METHOD OF INFLUENCING PLANT GROWTH

Walter Schoeller, Berlin-Westend, and Hans Goebel, Berlin-Reinickendorf, Germany, assignors to Schering-Kahlbaum A.-G., Berlin, Germany No Drawing. Application January 14, 1932, Serial No. 586,696, and in Germany January 22, 1931

7 Claims. (Cl. 47—58)

Our invention refers to means for influencing plant growth and more especially for accelerating the blossoming of plants.

It is an object of our invention to provide means by which the period of time within which the blossoms develop, can be materially shortened.

In a copending application for patent of the United States, Serial No. 514,698 filed by us jointly with Max Dohrn we have disclosed a method of influencing plant growth by adding to the fertilizers hormones or hormone-like substances of an animal or vegetable origin including substances of hormone-like action which have been produced synthetically, for instance technical follicle hormone obtainable from the urine of pregnant women, from placenta and from mares' urine; chemically pure crystallized follicle hormone produced according to Butenandt's "Untersuchungen über das weibliche Sexualhormon", (1931); Vegetable Growth Principles, called Tokokinine, prepared according to Loewe (Biochemische Zeitschrift 180/1927, p. 1-26) and Dohrn and Faure (Mediz. Klinik 1926, p. 1417); male hormone prepared according to Funk (Proceedings of the Society of Experimental Biology and Medicine 26/1929, p. 325). According to this method the roots are relied upon to absorb the hormones. We found that the sexual hormones of the warm-blooded animals were particularly adapted for this purpose.

We have now found that the same effect can be obtained in a still more efficient manner if the seeds, roots, tubers etc. of the plants are subjected to a preliminary treatment with the respective hormones or hormone preparations, which may also be combined.

For instance in the case of seeds, such as corn, barley or wheat seed, we may impregnate the grains with solutions, preferably watery, of the hormone or the like. Alternatively, we may mix the grains with pulverulent material, such as kieselguhr, wood-meal or the like, which is mixed with a suitable hormone preparation.

In certain cases, and more especially when treating seeds, this method can advantageously be combined with the pickling of the plants.

If the plants are treated in this manner, a premature, more reliable and more intense blossoming occurs.

In the case of tuberous plants, we prefer impregnating the tubers, shortly before planting them. Alternatively, we may also inject the respective hormone solution into the nutritive tissue of the tubers.

In practising our invention we may for instance proceed as follows:

Example 1 (wet pickling)

50 kilograms seeds of corn, barley, wheat, oats or the like are treated during one hour in the usual wet pickling apparatus with a solution of a sexual hormone, which contains at least 1000 to 10,000 mice units per litre. The liquid in excess is removed and the seeds are spread out for drying. Preferably this impregnation is combined with the usual wet pickling.

Example 2 (dry pickling)

50 kilograms seeds as above are shaken during five minutes in the usual dry pickling apparatus with about 150 grams of a dry sexual hormone preparation which contains at least 10,000 mice units per kilogram. The seed thus treated is then ready for use.

Preferably this treatment is combined with the usual dry pickling.

Example 3

Tubers and bulbs including potatoes, topinambours, dahlias, are preferably placed during some hours into a hormone solution containing at least 1000 to 10,000 mice units per litre. During the swelling process substantially all of the hormone is absorbed and the tubers or bulbs can at once be set.

Example 4

Tubers or bulbs as above can also be impregnated by coating them with a layer, which is capable of swelling in water and contains the hormone. We prefer using a solution of glue, gum or soap, to wh'ch has been added a solution of follicle hormone containing at least 10,000 mice units per litre. The tubers or bulbs agitated in such a solution are coated, without vigorous swelling, with a layer containing the hormone, wh'ch is subsequently dissolved in the soil.

Example 5

Tubers or bulbs can also be impregnated with a hormone by injecting a follicle hormone solution into the bulb. The injection is either applied to the bulbs themselves or between or into the bulb leaves before planting them.

The quantity of hormone applied per plant should be varied in accordance with the character of the plant. At an average 80 to 100 mice units are required per plant, but even the tenfold quantity will not harm the plant.

Our new method can be carried out with highly purified hormone oils or with the crystalline hormones.

Various changes may be made in the details disclosed in the foregoing specification without departing from the invention or sacrificing the advantages thereof.

We claim:—

1. The method of hastening the blossoming and ripening of plants comprising treating the seeds, roots, tubers, bulbs or the like before planting them with a solution of a hormone-like substance.

2. The method of hastening the blossoming and ripening of plants comprising treating the seeds, roots, tubers, bulbs or the like before planting them with a solution of a hormone.

3. The method of hastening the blossoming and ripening of plants comprising treating the seeds, roots, tubers, bulbs or the like before planting them with a solution of a hormone-like substance of vegetable origin.

4. The method of influencing plant growth comprising treating the seeds, roots, tubers, bulbs or the like before planting them with a solution of a synthetically produced hormone-like substance.

5. The method of influencing plant growth comprising treating the seeds, roots, tubers, bulbs or the like before planting them with a solution of a hormone-like substance, combining such treatment with the usual pickling step.

6. The method of hastening the blossoming and ripening of plants comprising injecting a solution of a hormone-like substance into the plants before planting them.

7. The method of hastening the blossoming and ripening of plants comprising injecting a solution of a hormone-like substance into the tubers of the plants before planting them.

WALTER SCHOELLER.
HANS GOEBEL.